United States Patent [19]

Godare et al.

[11] 4,328,013
[45] May 4, 1982

[54] BAFFLE PLATE FOR STEAM SEPARATOR

[75] Inventors: William L. Godare, Santa Rosa, Calif.; Frederic D. Wells, Jr., Shreveport, La.

[73] Assignee: W-K-M Wellhead Systems, Inc., Shreveport, La.

[21] Appl. No.: 159,259

[22] Filed: Jun. 13, 1980

Related U.S. Application Data

[63] Continuation-in-part of Ser. No. 118,937, Feb. 6, 1980, abandoned.

[51] Int. Cl.³ .............................................. B01D 19/00
[52] U.S. Cl. ........................................ 55/184; 55/185; 55/192; 55/204; 55/396; 55/459 R; 122/488
[58] Field of Search ................. 55/184, 185, 191, 192, 55/204, 205, 394, 396, 397, 398, 459 R, 459 D; 122/34, 488, 492

[56] References Cited

U.S. PATENT DOCUMENTS

| | | | |
|---|---|---|---|
| 1,325,376 | 12/1919 | Reilly | 55/398 |
| 2,010,456 | 8/1935 | Jones | 55/398 X |
| 2,812,828 | 11/1957 | Yellott et al. | 55/398 |
| 2,861,650 | 11/1958 | Yellott et al. | 55/398 |
| 2,869,677 | 1/1959 | Yellott et al. | 55/398 X |
| 2,952,330 | 9/1960 | Winslow | 55/204 X |
| 2,981,369 | 4/1961 | Yellott et al. | 55/398 |
| 3,151,961 | 10/1964 | Blackmore et al. | 55/459 R X |
| 3,481,118 | 12/1969 | Willis et al. | 55/394 X |
| 4,217,118 | 8/1980 | Kopf et al. | 55/397 X |
| 4,225,325 | 9/1980 | Diehl et al. | 55/459 D X |

Primary Examiner—Robert H. Spitzer
Attorney, Agent, or Firm—Stephen T. Belsheim; Marvin J. Marnock

[57] ABSTRACT

A steam separator (10) has a generally horizontal baffle plate (18) which separates the separator vessel (12) into an upper steam chamber (20) and a lower water chamber (22). The baffle plate (18) has a central opeing (51) which provides a flow passage to permit steam from the water chamber (22) to rise into the steam chamber (20). A steam outlet (28, 100) is connected to the vessel (12) for discharging steam from the steam chamber (20). The baffle plate (18) has a plurality of openings (62) at the periphery thereof, and each opening (62) has a scoop (60) associated therewith. Each scoop (60) extends over its respective opening (62) and faces in substantial opposition to the direction of motion of the swirling fluid to receive and direct the swirling fluid into the water chamber (22). Each scoop (60) has an upper portion (68) which extends upwardly from the baffle (18), a lower portion (70) extending downwardly from the baffle (18) and associated opening (62), and a side plate (74) extending along the inner side of the scoop (60).

10 Claims, 8 Drawing Figures

BAFFLE PLATE FOR STEAM SEPARATOR

REFERENCES TO COPENDING PATENT APPLICATION

This patent application is a continuation-in-part patent application of U.S. patent application Ser. No. 118,937 filed on Feb. 6, 1980 for an "IMPROVED BAFFLE PLATE FOR STEAM SEPARATOR" by William L. Godare and Frederic D. Wells, Jr, and now abandoned.

BACKGROUND OF THE INVENTION

This invention relates to the field of steam separators, and is directed more particularly to a cyclone steam separator that is utilized to process fluids received from a geothermal well, and which has an improved baffle plate arrangement between the steam and water chambers of the separator vessel.

The present so-called energy crisis has caused alternative sources of energy heretofore not considered attractive to become more attractive. One of these sources is geothermal energy. One introductory publication relating to geothermal energy is "The Basic of Applied Geothermal Engineering" by E. F. Wehlage and published in 1976 by Geothermal Information Services, 318 Cherrywood Street, West Covina, Calif. 91794.

Geothermal well fluid consists primarily of steam and water, and it is this steam which can be utilized by steam-operated power generators. However, in order to obtain optimum generation of power, only steam of the highest quality should be passed on to the power generator. The important burden of producing high quality steam from geothermal well fluid rests on the steam separator. Therefore, it can be seen that a steam separator in a geothermal well production setup performs a very important function.

In cyclone-type steam separators, the water droplets of an incoming steam-water mixture impinge against the inside surface of the separator vessel due to the centrifugal forces developed by the swirling motion of the fluid as it enters the vessel. The water then flows into a water collection chamber from which it passes to be disposed of in some acceptable fashion. The steam is relatively uneffected by this centrifugal action and rises into a steam chamber located near the top of the vessel. The steam exits the steam chamber through a steam outlet and is then transported for use in generating power or for other purposes. In a bottom outlet type of steam separator, a vertical steam outlet conduit extending between the water and steam chambers receives steam from the steam chamber and directs it out at the bottom of the vessel. In a top outlet type of steam separator, the steam rises and exits directly through the top of the vessel.

Heretofore, steam separators have utilized a baffle plate to separate and isolate the steam chamber from the water chamber. A central opening in the baffle plate allows the steam outlet conduit (in a bottom outlet type of separator) to pass between the steam and water chambers, and accommodates the passage of water downwardly through the baffle and into the water chamber. In one such steam separator, the outside edge of the baffle plate is connected to the vessel wall so that the centrifugal movement of the fluid causes the water to collect, for the most part, on or near the vessel wall a considerable distance radially outwardly of the annular opening. Consequently, the water does not always pass into the water collection chamber fast enough and in sufficient quantities to properly isolate the water and steam in the separator vessel. Swirling fluid above the baffle plate tends to sweep up any water standing on the baffle so that effective separation of the steam from the water is not achieved with this structure.

One attempt that has been undertaken to overcome this problem has been to employ a special outer loop element for the purpose of directing water from above the baffle plate to the water chamber located below it. The loop element is in the form of a C-shaped conduit which connects at one end with the vessel wall in the area immediately above the baffle and at the opposite end of the vessel wall at a location below the baffle. Although loop devices of this nature function in a generally acceptable manner with respect to directing wall past the baffle plate and allowing steam to exit the water chamber through the annular space defined between the steam outlet conduit and central opening, they have not been entirely satisfactory in other respects. Most notably, the need for the loop element adds to the cost and complexity of the steam separator and to the assembly difficulties. Moreover, the loop receives water at only a single location in the circumference of the vessel, and water at remote locations is delayed entering the loop for passage into the water collection chamber. The loop also complicates the structure and maintenance difficulties in that it is mounted to the outside wall of the vessel at an exposed location. Another problem is that corrosion and other damage to the loop can detract from its ability to function properly and can thus have a significant adverse effect on the performance of the steam separator.

In another embodiment, which has a central opening to receive the steam outlet conduit, the baffle plate is supported by a plurality of flanges that depend from the bottom surface of the baffle and are connected to the vessel wall so that the outside edge of the baffle plate is spaced apart from the vessel wall. These flanges are generally perpendicular to the direction of flow of fluid entering the water chamber and effectively prevent the formation of a vortex in the water chamber. However, the sudden collision of the swirling fluid with these perpendicular elements creates turbulence within the water chamber. Fine water droplets created by the turbulence are caught up in the steam updraft and carried along with the steam through the annular space defined between the steam outlet conduit and central opening thereby lowering the quality of the steam delivered from the separator. It is desirable that fluid be able to enter the water chamber in a manner so that a vortex is not created and with a minimum amount of turbulence.

The present invention is an improvement over the invention shown and described in copending U.S. patent application Ser. No. 031,722 filed Apr. 20, 1979 by William L. Godare, now U.S. Pat. No. 4,263,025. The cyclone steam separator shown in application Ser. No. 031,722 has a horizontal baffle plate with a series of openings spaced around its periphery and an upwardly projecting scoop adjacent each opening to direct the swirling fluid (mostly water with some steam) therethrough. The scoops are located next to the inner surface or wall of the separator vessel and are open on the end facing the swirling fluid in the vessel as well as on the inside. The fluid on the baffle tends to enter the scoops due to the centrifugal action of the swirling fluid and the fluid thus is directed downwardly through the openings into the water chamber located below the horizontal baffle plate.

Although this steam separator operates satisfactorily, under certain conditions of use, steam sometimes collects in the water chamber below the horizontal baffle, and it is desirable to remove from the water chamber the steam which is discharged by the swirling fluid below the baffle plate. Fluid oftentimes impinges the external surface of the horizontal portion of the scoops and does not pass into the water chamber. It is desirable that this fluid travel directly into the scoop openings. Fluid also oftentimes impinges the internal surface of the vertical portion of the scoop and splashes out of the scoop. Although others utilized a rim around the central opening in the baffle plate to assist separation of upwardly moving steam and downwardly swirling fluid stream, it is desirable that this well fluid be retained within the scoop.

SUMMARY OF THE INVENTION

The primary object of the present invention is to provide an improved cyclone-type steam separator utilized to process fluid received from a geothermal well, and which has a baffle plate between the steam and water chambers which permits gas to pass upwardly from the lower water chamber into the upper gas chamber without interfering with the downwardly moving stream of swirling fluid that enters the lower water chamber through the scoop. Another object of the invention is to provide a baffle plate which has scoops with a very large opening so that a larger bite is taken from the swirling fluid stream as it moves over the baffle plate. Another object of the invention is to provide a baffle plate which has scoops that direct the swirling fluid into the water chamber so as not to form a vortex therein and yet not create a turbulent condition within the water chamber.

In accordance with the invention, the baffle plate of the steam separator has a central opening, and includes an inner annular rim extending upwardly from the horizontal surface of the baffle plate adjacent the central opening. The rim assists in the separation of the upwardly moving steam and the downwardly swirling fluid. Scoops which extend from the inner periphery of the separator vessel are positioned on the baffle plate and are of a relatively large width spaced only slightly from the rim thereby to take a relatively large bite of the swirling fluid stream. Even though substantial steam may be discharged into the water chamber through the scoops which have very large openings, the present invention permits the steam to move upwardly from the water chamber into the gas chamber without interfering with or being restricted by the downwardly moving swirling stream of water and entrained steam. The scoops have side plates extending above and generally parallel to the rim which also assist in the separation of the upwardly moving steam and the downwardly moving water and steam mixture. These side plates also prevent fluid that impinges the scoop from splashing out of the scoop. The scoops do not extend an excessive distance over the openings. Each scoop has a generally vertical lower portion that extends into the water chamber. This lower portion directs the swirling fluid into the water chamber in such a manner that a vortex is prevented from forming without creating a turbulent condition within the water chamber.

BRIEF DESCRIPTION OF THE DRAWINGS

In the accompanying drawings which form part of the specification and are to be read in conjunction therewith.

DETAILED DESCRIPTION

Figures 1, 4:
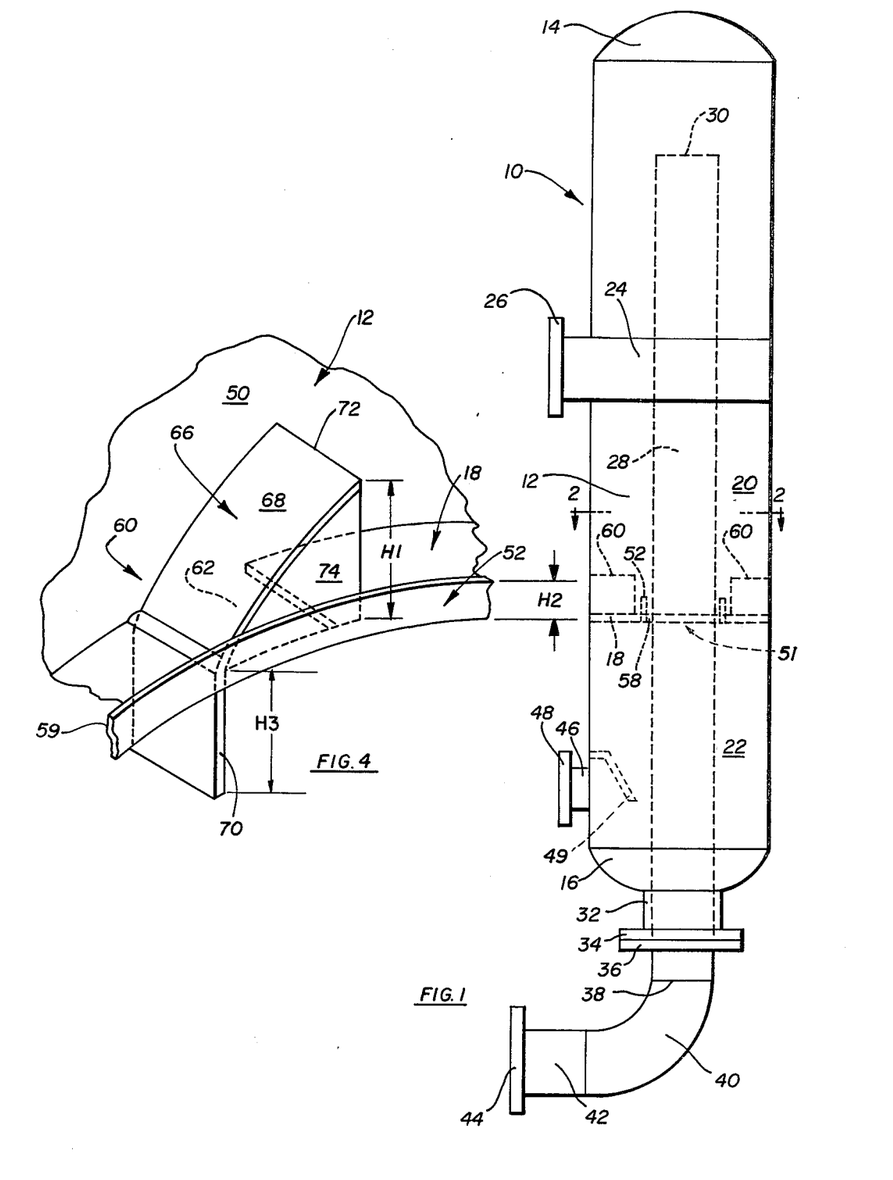
FIG. 1 is an elevational view of the bottom outlet type of a cyclone steam separator which is equipped with a baffle plate constructed in accordance with a preferred embodiment of the present invention as it relates to bottom outlet separators.
FIG. 4 is a perspective of a scoop employed with the baffle plate shown in FIGS. 2 and 3.

With initial reference to FIG. 1, numeral 10 generally designates a bottom outlet cyclone steam separator having a cylindrical separator vessel 12 in which separation of steam from water is effected. Vessel 12 is oriented vertically and is constructed of steel or any other suitable material. A dome shaped cover 14 is secured on vessel 12 to cover the top thereof by welding or in another suitable manner. A similarly shaped base 16 covers the bottom end of vessel 12 and is welded or otherwise secured thereto.

A baffle plate 18 is welded or otherwise secured within vessel 12 below the mid-point thereof to separate the interior of the vessel into a steam chamber 20 located above the baffle plate and a water chamber 22 located below baffle plate 18 in the lower portion of vessel 12. An inlet conduit 24 directs incoming fluid containing steam and water into steam chamber 20 at a location well above baffle plate 18. Inlet conduit 24 is preferably spiral shaped to direct the incoming fluid into vessel 12 in a curved path carrying the fluid along the cylindrical inside surface of vessel 12. Alternatively, inlet conduit 24 can be a straight pipe which connects tangentially to the inside wall of vessel 12. Conduit 24 has a flange 26 on its outer end to facilitate connection with a flowline which delivers fluid to the steam separator from another source.

A vertical steam outlet conduit 28 has an open top end 30 located within steam chamber 20 well above inlet conduit 24. Conduit 28 extends concentrically within vessel 12 and through a round central opening formed centrally in baffle plate 18. The lower portion of conduit 28 extends through a short conduit 32 which is welded to the bottom of base 16. The bottom end of the short conduit 32 has a flange 34 which is welded or otherwise secured to another flange 36. The lower portion of conduit 28 extends through flange 36 and is welded thereto to separate the interior of conduit 28 from water chamber 22 and at the same time prevent leakage at the bottom of water chamber 22. The bottom end of steam outlet conduit 28 is welded at 38 to a curved elbow pipe 40 which is in turn secured to a short conduit 42 having a flange 44 for connection with a steam outlet flowline. A water outlet 46 connects with the side of vessel 12 at a location near the bottom end of water chamber 22 to direct water out of the steam separator. Outlet 46 has a flange 48 on its outer end for connection with a line which directs water away from the steam separator 10 generally by the operation of pumps or the like connected to the line. A monitoring arrangement in water chamber 22 continuously monitors the water level in the water chamber and thereby controls the volume of water contained in water chamber 22. When the water reaches a predetermined high level the pumps are activated and water is drawn from water chamber 22 until the water reaches a predetermined low level. A rectangular water outlet baffle 49 is attached to the vessel 12 and extends over the water outlet and is spaced apart therefrom. In the event a vortex is created in the water contained in the water chamber, water outlet baffle 49 prevents the vacuum associated with this vortex from being drawn into the line. If such a vacuum was drawn into the line it would eventually enter the pumps and cause a disruption of the operation thereof.

Figure 2:
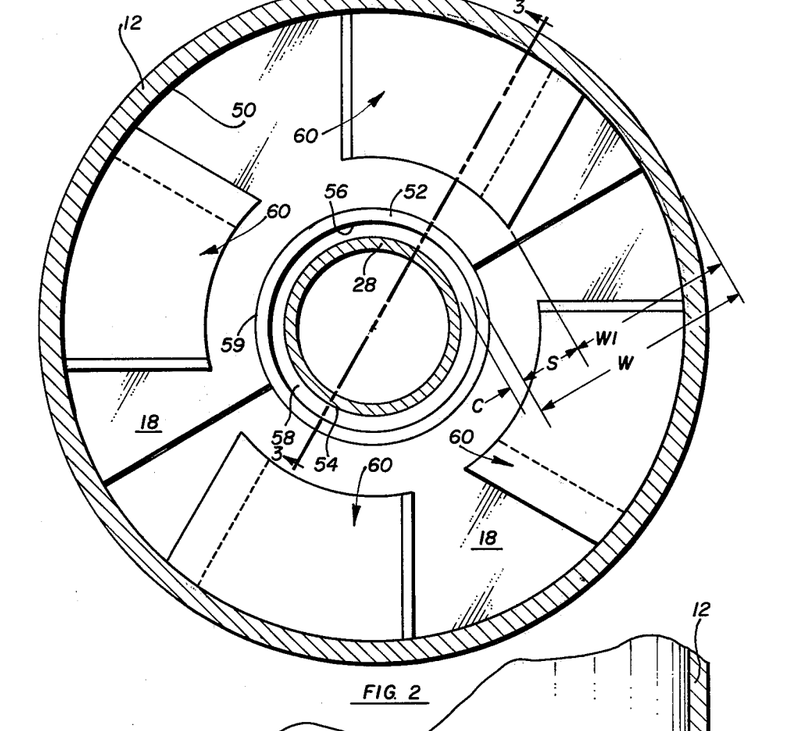
FIG. 2 is a plan view of the baffle plate taken generally along line 2—2 of FIG. 1 and showing the annular clearance between the baffle plate and the vertical steam outlet conduit.
Figure 3:
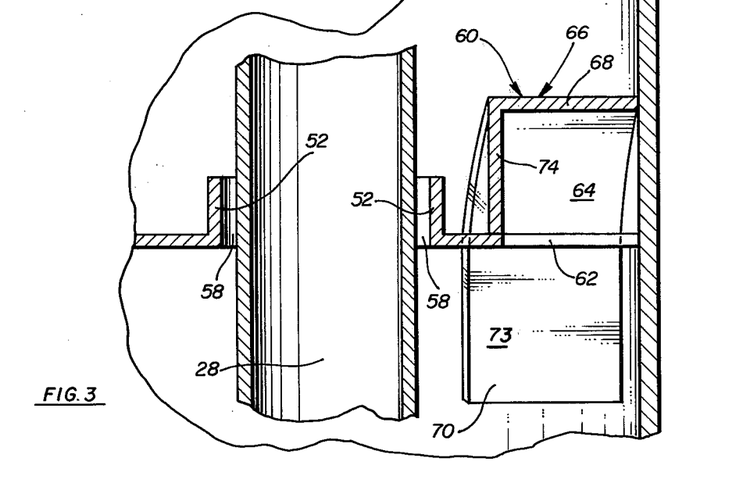
FIG. 3 is a sectional view taken generally along line 3—3 of FIG. 2.

Baffle plate 18 is a circular plate member which forms a horizontal partition separating steam chamber 20 and water chamber 22. Preferably, baffle plate 18 is located well below the center of vessel 12 and is welded to the cylindrical inside surface 50 of vessel 12. Baffle plate 18 has an inner annular rim 52 or hub which defines the central opening 51 extending through baffle plate 18. The vertical steam outlet conduit 28 has an outer periphery 54 which is spaced from the inner periphery 56 of rim 52 to define an annular space 58 therebetween. The outer periphery 59 of rim 52 is spaced from a plurality of scoops indicated generally at 60 which are arcuately spaced about baffle plate 18. Annular rim 52 extends from baffle plate 18 a sufficient distance so that it acts as a dam to prevent a film of liquid from forming over annular space 58.

Baffle plate 18 has a plurality of openings 62 spaced equidistantly around its peripheral edge. Each opening 62 is located adjacent the wall of separator vessel 12 and is large enough to permit the swirling fluid to flow downwardly through baffle plate 18 from steam chamber 20 to water chamber 22. Openings 62 are preferably of a generally rectangular configuration, although they may be formed in any desirable shape.

Each opening 62 has an associated scoop 60 projecting over it which serves to direct the swirling fluid mixture of water and steam through the associated opening 62 into water chamber 22, and to prevent the formation of a vortex in the water contained in the water chamber. Each scoop 60 has an open end 64 which faces in opposition to the direction of motion of the swirling water and steam mixture above baffle plate 18. Scoop 60 includes a cover plate generally indicated at 66 whih is secured along its outer side to inner periphery 50 of vessel 12. Cover plate 66 includes an upper portion 68 extending at an angle between approximately thirty degrees (30°) and approximately forty-five degrees (45°) with respect to the adjacent horizontal surface of baffle plate 18, and a lower portion 70 extending below opening 62 at an angle of approximately ninety degrees (90°) with respect to the adjacent horizontal surface of baffle plate 18.

As best seen in FIG. 4, upper portion 68 terminates in an edge 72 which defines the top of open end 64 of scoop 60 and is located laterally beyond opening 62. This upper portion aids in directing the flow of fluid downwardly to obtain maximum utilization of openings 62, and increases the efficiency of the separator to produce maximum volumes of high quality steam.

It is pointed out that the part of upper portion 68 which is laterally beyond opening 62 prevents fluid from passing straight downwardly into openings 62. Accordingly, only fluid which is adjacent the upper surface of baffle 18 is able to enter scoops 60, and this fluid is substantially all water since the lighter steam tends to rise rather than to fall toward baffle 18. The overhang of the upper portion 68 relative to the openings 62 is important in this respect in that it prevents downward passage of fluid toward openings 62 while permitting fluid to move toward the openings in a horizontal path. Consequently, the shape of scoops 60 makes them particularly effective in permitting water to drain through openings 62 while preventing steam from reaching openings 62 for passage below baffle 18 into the water chamber. The considerable distance between baffle 18 and inlet conduit 24 provides enough space to assure that the steam is not able to approach baffle 18 and possibly pass downwardly through openings 62 before it has had an opportunity to rise in steam chamber 20.

Since the water enters scoops 60 for the most part through their open ends 64, the combined area of the open ends of all of the scoops should be greater than the area of inlet conduit 24 to the steam separator. Otherwise, water could enter vessel 12 at a greater rate than it is allowed to pass below baffle 18, and a water buildup above baffle 18 could result from the flow restriction. Consequently, the total area presented by open ends 64 between each edge 72 and baffle 18 and between the wall of vessel 12 and the inside of scoop 60 should be at least greater than the area of inlet conduit 24 in order to avoid such a flow restriction, and preferably, be one and one-half (1½) times the area of inlet conduit 24. For similar reasons, the total area presented by all openings 62 in baffle plate 18 should equal at least that total area presented by open ends 64 of scoops 60.

The juncture of lower portion 70 with upper portion 68 occurs in the plane which defines the bottom of cover plate 66. Lower portion 70 extends into the water chamber a sufficient distance so that the area of the flat face 73 of lower portion 70 is at least equal to or greater than the area of the open end of scoop 60. Thus, the total area presented by the lower portions of plates 66 is equal to or greater than the total area presented by open ends 64 of the scoops.

A side plate 74 of each scoop 60 is secured between the inner edge of plate 66 and the upper horizontal surface of baffle plate 18. Side plate 74 extends generally parallel to but spaced from rim 52. The width of opening 62 and the width of the open end 64 of scoop 60 are over one-half the entire width of baffle plate 18 between rim 52 and vessel 12. Thus, a large bite is taken from the swirling fluid stream over baffle plate 18. Rim 52 and side plate 74 act as barriers or restrictions to separate the downward moving swirling fluid stream from the upwardly moving stream of steam through annular clearance 58 from water chamber 22 below baffle plate 18 to steam chamber 20. Side plate 74 also acts as a barrier to prevent swirling fluid that impinges plate 66 from splashing out of scoop 60. Thus, fine water droplets from this splash can not reach, and thus, are not carried by steam rising from water chamber 22 into steam outlet conduit 28.

Normally only a relatively small amount of steam will be in water chamber 22 below baffle plate 18 but with high volumes and high velocities of fluid entering inlet conduit 25 it is possible under certain conditions of use that a substantial amount of the steam may be discharged into water chamber 22. It is noted that rim 52 extends in a generally parallel relation to side plate 74 and is around one-half the height of side plate 74. Side plate 74 tends to restrict the swirling stream from moving inwardly and thereby aids in separating the upwardly moving gas (steam) stream and the downwardly moving stream of the water and steam mixture.

In use, a mixture of steam and water from a geothermal well or another source is directed to vessel 12 through inlet conduit 24. The spiral or tangential orientation of inlet conduit 24 with respect to the inside surface of vessel 12 causes the incoming fluid to move in a swirling path within the separator vessel. This swirling path is disposed at an angle of between approximately twelve degrees (12°) and approximately twenty-five degrees (25°) with respect to the generally horizontal baffle plate 18. The centrifugal forces resulting from such swirling motion causes the water droplets to impact against the vessel wall and, in cooperation with gravitational forces, causes the water to drain downwardly within steam chamber 20 toward baffle plate 18. The lighter steam is less effected by the centrifugal force and rises within steam chamber 20 where it enters the open top end 30 of steam outlet conduit 28 and flows out of the separator vessel for use in generating power or for another purpose.

However, since the open ends 64 of scoops 60 face in opposition to the direction of motion of the swirling fluid, and since openings 62 and open ends 64 of scoops 60 are relatively large, a large volume of the steam and water mixture is moved downwardly with the result that it is possible under certain conditions of use for a substantial amount of steam which is entrained with the water to be discharged through scoops 64 into water chamber 22. It is highly desirable that this steam be removed from water chamber 22 for dischage of steam from water chamber 22 through annular space 58 thereby the upwardly moving gas stream easily moves into gas chamber 20 without any appreciable interference from the downwardly moving swirling fluid stream. As previously mentioned, the total area presented by open ends 64 of scoops 60 has to at least equal, and is preferably one and one-half (1½) times greater than the total area of inlet 24 so as to permit a fast discharge of the swirling fluid from steam chamber 20 into water chamber 22.

The swirling fluid enters the scoop at an angle of between approximately twelve (12) and twenty-five (25) degrees with respect to the baffle plate and impinges upper portion 68 of plate 66 which is disposed at an angle of between approximately thirty (30) and forty-five (45) degrees with respect to the baffle plate. The swirling fluid is then directed to lower portion 70 of plate 66 which changes the direction in which the swirling fluid moves to being generally perpendicular to the baffle plate. Thus, it is seen that the orientation of flow of the swirling fluid is gradually changed from being somewhat horizontal when it enters the scoop to being vertical after it enters the water chamber. Because the swirling fluid enters the water in the water chamber in a vertical direction it does not have a tendency to create a vortex therein. This is in contrast to a swirling fluid that enters the water chamber at an orientation other than vertical since the horizontal component of such a swirling fluid tends to create a vortex. However, this tendency to create a vortex is directly proportional to the magnitude of the horizontal component. Further, the gradual change in direction of the swirling fluid reduces the amount of turbulence associated with such change. This is opposed to a sudden change in the direction of flow (e.g., generally horizontally disposed swirling fluid impinging a generally vertical member) which would create turbulence.

In a typical 36 inch (900 mm) diameter bottom outlet type steam separator, the width W of baffle plate 18 as shown in FIG. 2 is around 10 inches (250 mm) with scoop 60 being of a width W1 around 8 inches (200 mm) and the clearance or space S between scoop 60 and rim 52 being around 2 inches (50 mm). Width C of annular space 58 between rim 52 and steam outlet conduit 28 is around one inch (25 mm). The height H1 of scoop 60 is around ten inches (250 mm) and the height H2 of rim 52 is around 5 inches (125 mm). The height H3 of the lower portion of plate 66 is approximately ten inches (250 mm). This dimension is consistent with the general rule that the height (H3) of the lower portion is equal to approximately the width (W1) of the scoop plus two (2) inches (50.8 mm). However, in no case for steam separators of conventional sizes does the height (H3) of the lower portion equal less than six (6) inches (152 mm). With the dimensions in the ranges indicated above, a relatively high volume of the steam and water mixture may be processed through steam separator 10 although other dimensions can be used under many circumstances and with varying sizes of separator vessels without adversely effecting the separator performance to a significant extent.

FIGS. 5-8 illustrate the top outlet type of steam separator. The top outlet type of steam separator is constructed substantially the same in many respects as the bottom outlet type of steam separator. Therefore, similar elements of the top outlet separator are illustrated with the same numerals as their corresponding elements of the bottom outlet separator but followed by the capital letter "A".

Figure 5:
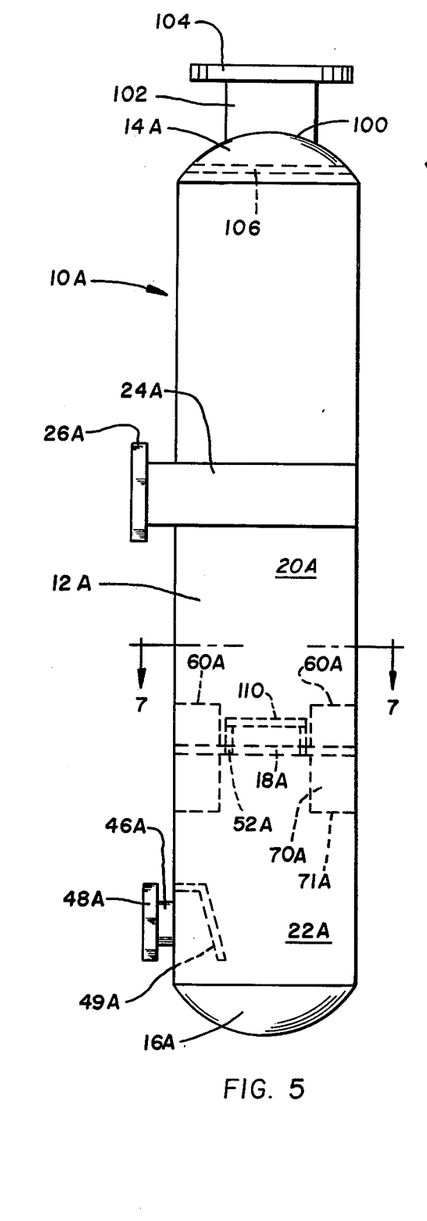
FIG. 5 is an elevational view of the top outlet type of a cyclone steam separator which is equipped with a baffle plate constructed in accordance with a preferred embodiment of the present invention as it relates to top outlet separators.

Referring to FIG. 5, numeral 10A generally designates a top outlet cyclone steam separator having a cylindrical separator vessel 12A in which separation of steam from water is effected. Vessel 12A is oriented vertically and is constructed of steel or any other suitable material. A dome shaped cover 14A is secured on vessel 12A to cover the top thereof by welding or in another suitable manner. A similarly shaped base 16A covers the bottom end of vessel 12A and is welded or otherwise secured thereto.

A baffle plate 18A is welded or otherwise secured within vessel 12A below the mid-point thereof to separate the interior of the vessel into a steam chamber 20A located above the baffle plate and a water chamber 22A located below baffle plate 18A in the lower portion of vessel 12A. An inlet conduit 24A directs incoming fluid containing steam and water into steam chamber 20A at a location well above baffle plate 18A. Inlet conduit 24A is preferably spiral shaped to direct the incoming fluid into vessel 12A in a curved path carrying the fluid along the cylindrical inside surface of vessel 12A. Alternatively, inlet conduit 24A can be a straight pipe which connects tangentially to the inside wall of vessel 12A. Conduit 24A has a flange 26A on its outer end to facilitate connection with a flowline which delivers fluid to the steam separator from another source.

Figure 6:
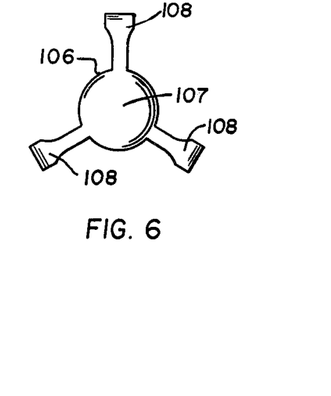
FIG. 6 is a plan view of the top steam outlet baffle.

Dome shaped cover 14A has a top steam outlet 100 therein. A short conduit 102 is connected to the steam outlet 100 and extends from vessel 12A. Short conduit 102 has a flange 104 on its outer end to facilitate connection with a line that carries the steam from the steam separator. A steam outlet baffle 106 is secured to the vessel adjacent top steam outlet 100. Steam outlet baffle 106 includes a circular central portion 107 with a trio of legs 108 extending radially outwardly therefrom. The steam outlet baffle is secured at its legs 108 to the inner surface of the vessel.

Baffle plate 18A is a circular plate member which forms a horizontal partition separating steam chamber 20A from water chamber 22A. Preferably, baffle plate 18A is located well below the center of vessel 12A and is welded to the cylindrical inside surface 50A of vessel 12A. Baffle plate 18A has an inner annular rim or hub 52A which defines the central opening extending through baffle plate 18A. A perforated plate 110 having a plurality of generally circular perforations 112 is welded or otherwise secured to the top edge 114 of rim 52A. For the 36 inch (900 mm) diameter top outlet type steam separator, it is preferable that the total area of the perforations 112 equals approximately the area of the annular space defined between outer periphery 54 of steam outlet conduit 28 and inner periphery 56 of rim 52 of the bottom outlet separator in a 36 inch (900 mm) diameter bottom outlet type steam separator as shown in FIGS. 1 and 2.

Figure 7:
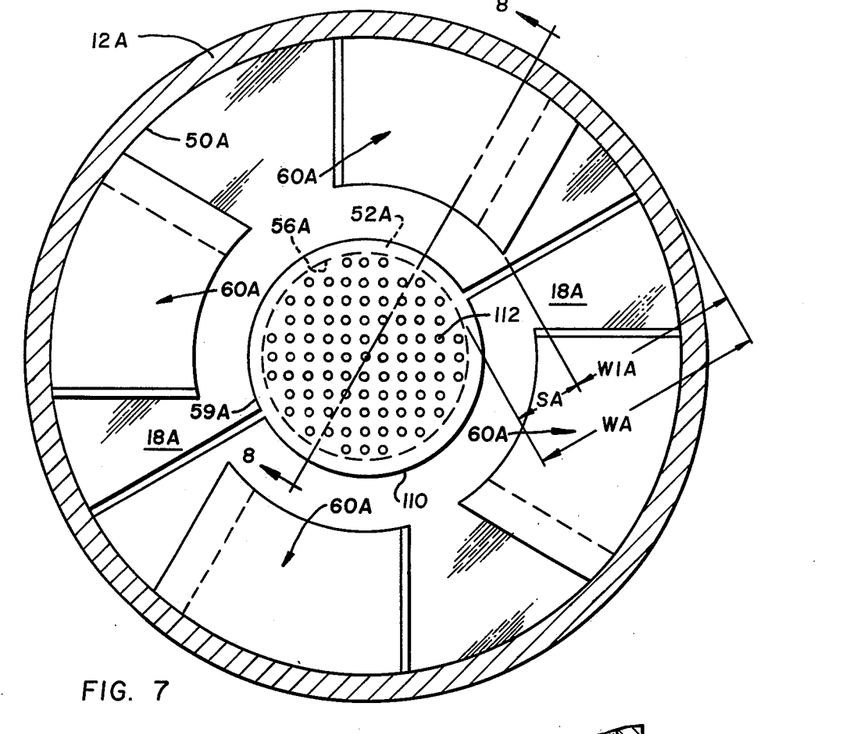
FIG. 7 is a plan view of the baffle plate taken generally along line 7—7 of FIG. 5 and illustrates the perforated plate attached to the annular rim.
Figure 8:
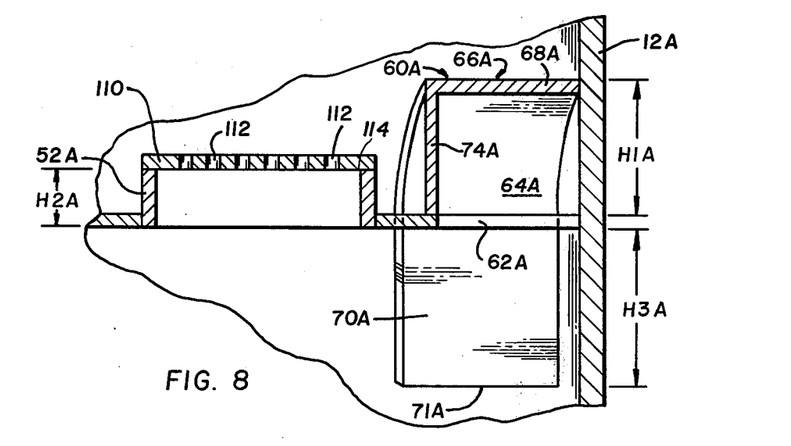
FIG. 8 is a sectional view taken generally along line 8—8 of FIG. 7.

The construction of the openings 62A in the baffle plate and their associated scoops 60A for the top outlet separator is identical to that of the bottom outlet separator. Therefore, the previous description of the baffle plate openings and their associated scoops of the bottom outlet separator will suffice for that of the top outlet separator.

Rim 52A and side plate 74A act as barriers or restrictions to separate the downward moving swirling fluid stream from the upwardly moving stream of steam through the central opening in baffle plate 18A from water chamber 22A below baffle plate 18A to steam chamber 20A. Side plate 74A also acts as a barrier to prevent swirling fluid that impinges plate 66A from splashing out of scoop 60A. Thus, fine water droplets from this splash can not reach, and thus, are not carried by steam rising from water chamber 22A into steam outlet 100.

Normally only a relatively small amount of steam will be in water chamber 22A below baffle plate 18A but with high volumes and high velocities of fluid entering inlet conduit 24A it is possible under certain conditions of use that a substantial amount of the steam may be discharged into water chamber 22A. It is noted that rim 52A extends in a generally parallel relation to side plate 74A and is around one-half the height of side plate 74A. Side plate 74A tends to restrict the swirling stream from moving inwardly and thereby aids in separating the upwardly moving gas (steam) stream and the downwardly moving stream of the water and steam mixture.

In use, a mixture of steam and water from a geothermal well or another source is directed to vessel 12A through inlet conduit 24A. The spiral or tangential orientation of inlet conduit 24A with respect to the inside surface of vessel 12A causes the incoming fluid to move in a swirling path within the separator vessel. This swirling path is disposed at an angle of between approximately twelve degrees (12°) and approximately twenty-five degrees (25°) with respect to the generally horizontal baffle plate 18A. The centrifugal forces resulting from such swirling motion causes the water droplets to impact against the vessel wall and, in cooperation with gravitational forces, causes the water to drain downwardly within steam chamber 20A toward baffle plate 18A. The lighter steam is less effected by the centrifugal force and rises within steam chamber 20A where it enters top steam outlet 100 and flows out of the separator vessel for use in generating power or for another purpose.

However, since the open ends 64A of scoops 60A face in opposition to the direction of motion of the swirling fluid, and since openings 62A and open ends 64A of scoops 60A are relatively large, a larger volume of the steam and water mixture is moved downwardly with the result that it is possible under certain conditions of use for a substantial amount of steam which is entrained with the water to be discharged through scoops 60A into water chamber 22A. It is highly desirable that this steam be removed from water chamber 22A for discharge through top steam outlwet 100. The present invention permits the discharge of steam from water chamber 22A through the central opening in baffle plate 18A and perforated plate 110 thereby to permit the upwardly moving gas stream to move easily into gas chamber 20A without any appreciable interference from the downwardly moving swirling fluid stream. As previously mentioned, the total area presented by open ends 64A of scoops 60A is preferably one and one-half (1½) times greater than the total area of inlet 24A and this permits a fast discharge of the swirling fluid from steam chamber 20A into water chamber 22A.

The lower portions 70A of scoops 60A of the top outlet type of steam separator direct the swirling fluid in a manner identical to that of the bottom outlet separator. Thus, the description of this feature for the bottom outlet separator will suffice for that of the top outlet separator.

In a typical 36 inch (900 mm) diameter top outlet type steam separator, the width WA of baffle plate 18A is shown in FIG. 7 is around 10 inches (250 mm) with scoop 60A being of a width W1A around 8 inches (200 mm) and the clearance or space SA between scoop 60A and rim 52A being around 2 inches (50 mm). The total area presented by the perforations of perforated plate 110 is approximately 47.2 square inches (30,500 square mm). The height H1A of scoop 60A is around ten inches (250 mm) and the height H2A of rim 52A is around 5 inches (125 mm). The height H3A of the lower portion of plate 66A is approximately ten inches (25 mm). This dimension is consistent with the general rule that the height (H3) of the lower portion is equal to approximately the width (W1) of the scoop plus two (2) inches (50.8 mm). However, in no case for steam separators of conventional sizes does the height (H3) of the lower portion equal less than six (6) inches (152 mm). The diameter of top steam outlet 100 is approximately eight (8) inches (200 mm), and the diameter of central portion 107 of steam outlet baffle 106 is approximately six and one-half (6½) inches (165 mm). With the dimensions in the ranges indicated above, a relatively high volume of the steam and water mixture may be processed through the top outlet type of steam separator 10A although other dimensions can be used under many circumstances and with varying sizes of separator vessels without adversely effecting the separator performance to a significant extent.

What is claimed is:

1. A steam separator comprising:
   a separator vessel presenting a substantially cylindrical inside surface;
   an inlet for directing incoming fluid containing a mixture of steam and water into said vessel in a manner to effect swirling motion of the fluid around said inside surface, a water chamber in a lower portion of said vessel for receiving water which impinges said inside surface and drains downwardly, a water outlet for discharging water from said water chamber, a steam chamber in an upper portion of said vessel for receiving steam which rises upwardly;
   a steam outlet means, connected to said vessel, for discharging steam from said steam chamber;
   a generally horizontal baffle plate mounted in said separator vessel at a location to form a partition which separates said water and steam chambers from one another, said baffle plate having a central opening and being located below said inlet so that incoming fluid is directed into said steam chamber, said baffle plate having an annular rim about the perimeter of said central opening and extending upward from the top surface of said baffle to act as a dam to prevent formation of liquid film over said central opening, said central opening providing a flow passage to permit steam from said water chamber to pass upwardly into said steam chamber;
   a plurality of spaced apart openings in said baffle plate of sufficient size to pass the incoming fluid downwardly through said baffle plate into said water chamber;
   a plurality of scoop elements on said baffle plate associated with respective said openings, said scoop elements projecting above said baffle plate and over said respective openings with an open end of each scoop element facing substantially in opposition to the direction of motion of the swirling fluid thereby to receive and direct the swirling fluid through said respective opening into said water chamber, each of said scoop elements having an upper portion extending upwardly from said horizontal baffle plate, a side plate along the inner side thereof extending generally vertically from the baffle plate, and a lower portion extending substantially perpendicularly and vertically downwardly from said horizontal baffel plate, whereby said lower portion directs the swirling fluid into said water chamber at an angle equal to approximately ninety degrees with respect to said baffle plate to thereby reduce turbulence and the tendency of the fluid to form a vortex in said water chamber.

2. A steam separator as set forth in claim 1 wherein said steam outlet means includes a top steam outlet in said steam chamber, and a steam outlet baffel positioned adjacent said top steam outlet for removing water droplets from the rising steam.

3. A steam separator as set forth in claim 1 wherein said separator vessel includes a water outlet baffle positioned adjacent said water outlet for allowing only water to enter said water outlet.

4. A steam separator as set forth in claim 1 wherein the angle at which said upper portion of each of said scoops extends with respect to said baffle plate is greater than the angle at which said swirling fluid is disposed when entering said scoop with respect to said baffle plate.

5. A steam separator as set forth in claim 1 wherein said upper portion of each scoop element is generally at an angle of between approximately thirty degrees and approximately forty-five degrees with respect to said baffle plate.

6. A steam separator as set forth in claim 1 wherein the area presented by said lower portion of each of said scoop elements is greater or equal to the area presented by said open end of each of said scoop elements.

7. A steam separator as set forth in claim 1 wherein said steam outlet means includes a vertical steam conduit extending from said water chamber to said steam chamber, said central opening receives said vertical steam conduit and an annular space defined within aid central opening as between said baffle plate and said vertical team conduits permits the steam from said water chamber to pass upwardly into said steam chamber.

8. A steam separator as set forth in claim 1 further including a perforated plate secured over said central opening so as to prevent the swirling fluid in said steam chamber from disturbing the contents of said water chamber and for permitting steam from said water chamber to pass upwardly into said steam chamber.

9. A steam separator as set forth in claim 1 further including a steam conduit extending from the water chamber to the steam chamber through said central opening for discharging steam from the steam chamber, said steam conduit having one end secured to steam vessel in communication with said steam outlet and being spaced from said baffle plate to define a fluid flow passage between the baffle plate and the steam outlet conduit to permit steam from the water chamber to pass upwardly into the steam chamber.

10. A steam separator comprising:
    a separator vessel presenting a substantially cylindrical inside surface;
    an inlet for directing incoming fluid containing a mixture of steam and water into said vessel in a manner to effect swirling motion of the fluid around said inside surface, a water chamber in a lower portion of said vessel for receiving water which impinges said inside surface and drains downwardly, a water outlet for discharging water from said water chamber, a steam chamber in an upper portion of said vessel for receiving steam which rises upwardly;
    a steam outlet means, connected to said vessel, for discharging steam from said steam chamber, said steam outlet means including a steam outlet in said steam chamber and a steam outlet baffle positioned adjacent said top steam outlet for removing water droplets from the rising steam;
    a generally horizontal baffle plate mounted in said separator vessel at a location to form a partition which separates said water and steam chambers from one another, said baffle plate having a central opening and being located below said inlet so that incoming fluid is directed into said steam chamber, said central opening providing a flow passage to permit steam from said water chamber to pass upwardly into aid steam chamber;

a plurality of spaced apart openings in said baffle plate of sufficient size to pass thwe fluid downwardly through said baffle plate into said water chamber;

a plurality of scoop elements on said baffle plate associated with respective said openings, said scoop elements projecting above said baffle plate and over said respective openings with an open end of each scoop element facing substantially in opposition to the direction of motion of the swirling fluid thwereby to receive and direct the swirling fluid through said respective opening into said water chamber, each of said scoop elements having an upper portion extending upwardly from said horizontal baffle plate, and a lower portion extending vertically downwardly from said horizontal baffle plate, whereby said lower portion directs the swirling fluid into said water chamber at an angle equal to approximately ninety degrees with respct to said baffle plate; and a peforated plate secured over said central opening so as to prevent the swirling fluid in said steam chamber from disturbing the contents of said water chamber and for permitting steam from said water chamber to pass upwardly into said steam chamber.

\* \* \* \* \*

UNITED STATES PATENT AND TRADEMARK OFFICE
CERTIFICATE OF CORRECTION

PATENT NO. : 4,328,013
DATED : May 4, 1982
INVENTOR(S) : William L. Godare/ Frederic D. Wells, Jr.

It is certified that error appears in the above-identified patent and that said Letters Patent are hereby corrected as shown below:

Abstract, line 4, delete "opeing" and substitute -- opening --.

Column 11, line 54, delete "baffel" and substitute -- baffle --;

line 62, delete "baffel" and substitute -- baffle --.

Column 12, line 20, delete "aid" and substitute -- said --;

line 22, delete "team" and substitute -- steam --.

Column 13, line 11, delete "thwereby" and substitute -- thereby --.

Signed and Sealed this

Fifth Day of July 1983

[SEAL]

Attest:

Attesting Officer

GERALD J. MOSSINGHOFF
Commissioner of Patents and Trademarks